(12) United States Patent
Weaver

(10) Patent No.: US 8,308,185 B2
(45) Date of Patent: Nov. 13, 2012

(54) PIN-ENGAGING DRAWBAR AND LOCK PLATE ASSEMBLY

(76) Inventor: Danny C. Weaver, Shreveport, LA (US)

( * ) Notice: Subject to any disclaimer, the term of this patent is extended or adjusted under 35 U.S.C. 154(b) by 196 days.

(21) Appl. No.: 12/657,741

(22) Filed: Jan. 27, 2010

(65) Prior Publication Data

US 2010/0201102 A1    Aug. 12, 2010

Related U.S. Application Data

(60) Provisional application No. 61/206,244, filed on Jan. 30, 2009.

(51) Int. Cl.
*B60D 1/28* (2006.01)
(52) U.S. Cl. .................................................. 280/506
(58) Field of Classification Search .................. 280/506
See application file for complete search history.

(56) References Cited

U.S. PATENT DOCUMENTS

| | | | | |
|---|---|---|---|---|
| 5,423,566 | A | * | 6/1995 | Warrington et al. ....... 280/415.1 |
| 6,036,417 | A | | 3/2000 | Weaver .............................. 410/7 |
| 7,448,640 | B2 | | 11/2008 | Weaver ......................... 280/507 |
| 2010/0283225 | A1 | * | 11/2010 | Lahn ............................. 280/506 |

* cited by examiner

Primary Examiner — Kevin Hurley
(74) Attorney, Agent, or Firm — John M. Harrison

(57) ABSTRACT

A pin-engaging drawbar and lock plate assembly is designed to mount and stabilize in the drawbar of a trailer hitch or alternative trailer and accessory hitch or receiver assembly. In one embodiment the pin-engaging drawbar and lock plate assembly includes a bolt extending into the drawbar, typically having the bolt head secured to a lock plate positioned beneath a locking pin extending transversely through the receiver and the drawbar. An angle brace is fixed to the lock plate and engages the locking pin, and the locking pin openings are typically vertically elliptical or elongated in the drawbar to facilitate rotating a nut on the extending threaded end of the bolt and forcing the angle brace against the locking pin, thus tightening the drawbar against the hitch receiver. In another embodiment the bolt extends through a slotted front stabilizing plate to the lock plate and rotating the nut forces the lock plate against the hitch receiver and the angle plate and further tightens and stabilizes the drawbar against the hitch receiver. A second stabilizing plate can be provided rearwardly of the angle brace for engaging the drawbar and the hitch receiver and further stabilizing the assembly inside the hitch receiver. The locking action in all embodiments substantially eliminates both vertical and horizontal slack or play between the drawbar and the hitch receiver.

11 Claims, 2 Drawing Sheets

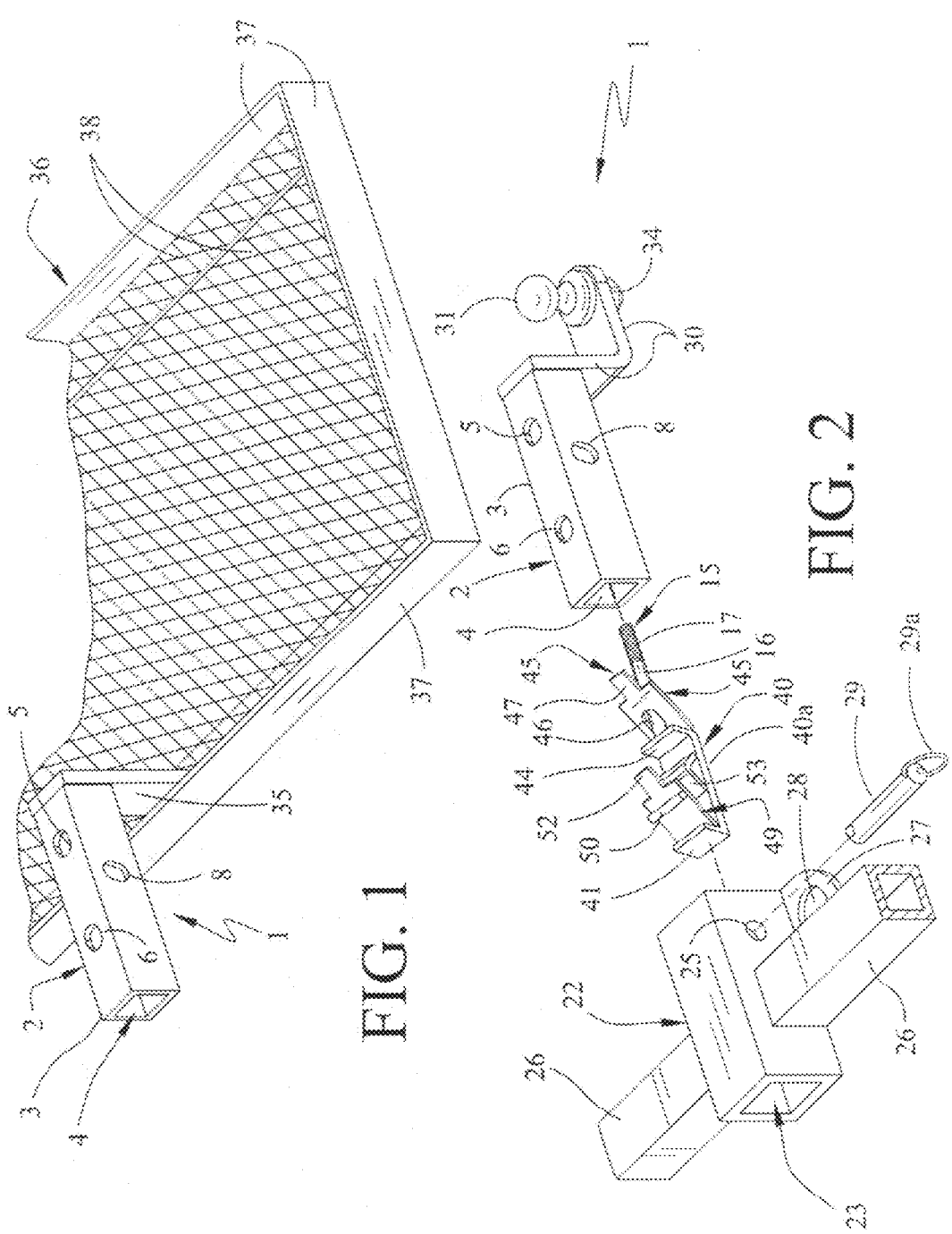

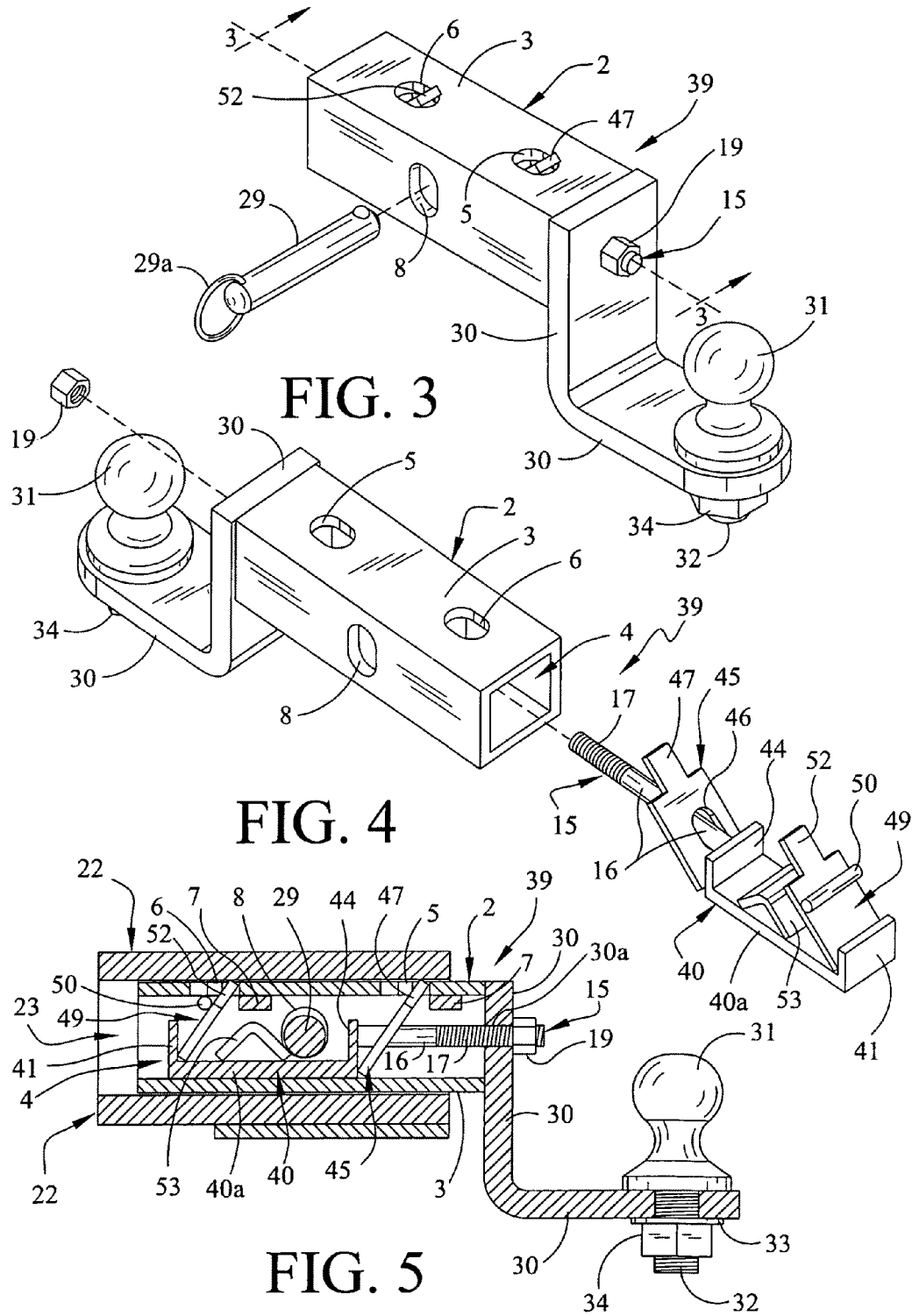

PIN-ENGAGING DRAWBAR AND LOCK PLATE ASSEMBLY

CROSS-REFERENCE TO RELATED APPLICATIONS

This application claims the benefit of and incorporates by reference U.S. Provisional Application Ser. No. 61/206,244, filed Jan. 30, 2009.

BACKGROUND OF THE INVENTION

Field of the Invention

This invention relates to trailer hitches, receptacles and receivers for vehicles and more particularly, to a pin-engaging drawbar and lock plate assembly designed to selectively tighten a drawbar inside a receiver and substantially prevent drawbar vibration in both the horizontal and vertical axis while towing a trailer or carrying an accessory. One of the problems involved in towing trailers and carrying accessory equipment using conventional drawbars inserted in receiver receptacles or sleeves is the tolerance, slack or play between the drawbar frame and the inside surfaces of the hitch receiver, which results in vibration and wear, both horizontally and vertically, during the towing or carrying operation.

The pin-engaging drawbar and lock plate assembly of this invention includes a lock plate located inside a drawbar and attached to a bolt having a threaded end extending through the front of the drawbar, typically at the ball mount. The lock plate includes an angle brace and the lock plate and angle brace orientation is such that rotation of a nut threaded on the bolt against the ball mount draws the bevelled surface of the angle brace against a locking pin extended transversely through opposed, vertically-elongated or elliptically-shaped openings in the drawbar and opposed registering round openings in the receiver. This action removably locks and immobilizes the drawbar inside the hitch receiver and substantially eliminates horizontal and vertical drawbar vibration. Front and rear stabilizing plates can also be positioned in engagement with the drawbar, lock plate and receiver to further stabilize the drawbar in the receiver upon tightening of the nut on the bolt.

SUMMARY OF THE INVENTION

The pin-engaging drawbar and lock plate assembly of this invention is characterized by a lock plate slidably engaging the bottom inside surface of a drawbar, with a lock plate engaging leg facing the front or connecting end of the drawbar. An angle brace is fixed to the lock plate and in a first aspect of this embodiment the lock plate engaging leg is welded or otherwise attached to the head or shank of a bolt extending to the front of the drawbar, such that rotation of a nut threaded on the bolt against the ball mount that receives the threaded end of the bolt causes the lock plate to selectively advance or recede linearly along the bottom surface of the drawbar. The angle brace is designed to engage a pin or bolt transversely extended through vertically elongated, opposed openings located in the drawbar and conventional registering round openings in the hitch receptacle or receiver. Accordingly, rotation of the nut threaded on the bolt causes the lock plate and angle brace to advance forwardly in the drawbar and the angled surface of the angle brace engages the locking pin and forces the drawbar downwardly due to the "play" or slack in the elongated drawbar openings. This action jams, locks or wedges the drawbar against the hitch receiver. The locked drawbar configuration effectively reduces vibration in the drawbar, either in the horizontal or vertical plane, inside the hitch receiver. In an alternative aspect of this embodiment of the invention the nut is welded or otherwise attached to the lock plate engaging leg and the bolt is extended through the front or connecting end of the drawbar (typically, the ball mount) and threaded into the fixed nut. Rotation of the bolt at the head thus also effects sliding movement of the lock plate inside the drawbar as described above.

In a second embodiment of the invention the lock plate engages one end of a front stabilizing plate having a front stabilizing plate slot for receiving the bolt and a front tab projecting through a front top frame opening in the drawbar. The lock plate is typically fixed to the head or shank end of the bolt and the front tab extends from the front stabilizing plate through the top front opening in the top of the drawbar to engage the receiver. Rotation of the nut on the threaded end of the bolt extending through the end of the drawbar or the ball mount, adjusts the position of the angle brace fixed to the lock plate against the mount pin in the opposed, vertically elongated mount pin openings. Accordingly, in all embodiments, it will be appreciated that the threads of the bolt may be extended through an opening in the front or connecting end or ball mount of the drawbar or other mount plate member mounted thereon and the opposite end or head of the bolt welded to the lock plate, such that the nut may be rotated on the bolt and the lock plate moved forwardly or rearwardly inside the drawbar, depending upon the direction of rotation of the nut. Alternatively, the bolt may be reversed in the drawbar and the nut is welded to the lock plate and receives the bolt threads, with the head end of the bolt extending through a front opening in the drawbar or through a mount plate or ball plate member welded or otherwise attached to the drawbar. In both cases, the lock plate is caused to move forwardly and rearwardly in the drawbar to tighten and loosen the mount pin by selective rotation of the nut or the bolt.

In yet another embodiment of the invention a rear stabilizing plate extends from the lock plate at a lock plate leg, upwardly at an angle, typically substantially parallel to the front stabilizing plate, and has a rear tab extending through a second top frame opening in the drawbar to engage the receiver. Tightening of the bolt or nut as described above tightens both the front and rear tabs against the receiver and further stabilizes the drawbar in the receiver.

BRIEF DESCRIPTION OF THE DRAWINGS

The invention will be better understood by reference to the accompanying drawings, wherein:

FIG. 1 is a perspective view of an accessory mount using the pin-engaging drawbar and lock plate assembly of this invention, more particularly illustrating an accessory support platform fitted with a mount bracket attached to the drawbar for removably supporting the platform from a hitch receiver and trailer hitch;

FIG. 2 is a perspective view of an embodiment of the pin-engaging drawbar and lock plate assembly embodiment of this invention, wherein the drawbar element receives a hitch ball and bracket combination for attachment to a receiver and trailer hitch;

FIG. 3 is a perspective view of the pin-engaging drawbar and lock plate assembly positioned inside a drawbar;

FIG. 4 is an exploded view of the pin-engaging drawbar and lock plate assembly illustrated in FIG. 3; and FIG. 5 is a sectional view taken along line 3-3 of the pin-engaging drawbar and lock plate assembly and the drawbar illustrated in FIG. 3, more particularly illustrating a typical positioning of the assembly components in the drawbar with respect to the hitch receiver;

DESCRIPTION OF THE PREFERRED EMBODIMENTS

Referring initially to FIGS. 2, 4 and 5 of the drawings, a typical embodiment of the pin-engaging drawbar and lock plate assembly of this invention is generally illustrated by reference numeral 1. The pin-engaging drawbar and lock plate assembly 1 is characterized by a drawbar 2 which has a drawbar frame 3, typically constructed of square tubing of suitable length and wall thickness and having a frame interior 4. The drawbar 2 is further provided with opposed, vertically elongated or elliptical drawbar mount pin openings 8, which are transversely provided in the drawbar frame 3, as illustrated. A mount pin 29 is extended through the drawbar pin openings 8 and through a pair of corresponding, typically round, registering mount pin openings 25, provided in the trailer and accessory hitch or receiver 22, as illustrated in FIG. 2 of the drawings. Accordingly, the drawbar 2 is removably tightened or locked inside the hitch interior 23 of the trailer and accessory hitch or receiver 22 as the mount pin 29 is extended through the registering hitch mount pin openings 25 and drawbar mount pin openings 8, respectively, as illustrated in FIG. 5. The trailer and accessory hitch or receiver 22 is typically welded, bolted or otherwise attached to a trailer hitch mount 26 of desired configuration which is designed to fit on a towing vehicle (not illustrated) for towing a trailer (not illustrated) or mounting accessory equipment, as hereinafter further described. A safety chain bracket 27 and hook opening 28 therein are also typically provided on each side of the trailer and accessory hitch or receiver 22. A mount pin ring 29a is typically provided in one end of the mount pin 29 for ease in manipulation of the mount pin 29 during the insertion and withdrawal procedures.

As further illustrated in FIGS. 2 and 3-5 of the drawings, an L-shaped ball mount 30 is typically provided and has a horizontal leg designed to receive a trailer ball 31, wherein a threaded post 32, extending downwardly from the trailer ball 31, projects through an opening in the horizontal leg of the ball mount 30 and is typically secured in place by means of a ball lock washer 33 and a ball nut 34 (FIG. 5). The vertical leg of the ball mount 30 is typically welded to the open front or connecting end of the drawbar 2. Accordingly, the hitch coupler (not illustrated) of a trailer can be secured on the trailer ball 31 in conventional fashion and towed by a vehicle when the drawbar 2 is fitted inside the hitch interior 23 of the trailer and accessory hitch or receiver 22 and the mount pin 29 is extended transversely through the registering elongated drawbar mount pin openings 8 and round hitch mount pin openings 25, as further illustrated in FIG. 5.

Referring now to FIGS. 2, 4 and 5 of the drawings, an angle brace 53 has both legs seated inside the drawbar 2, fixed to the lock plate base 40a, which is positioned with a flat surface thereof located on the flat bottom leg of the drawbar 2. The lock plate 40 is characterized by an upward-standing lock plate leg 41 and a lock plate engaging leg 44, which legs span the mount pin 29 that projects transversely through the respective round hitch mount pin openings 25 and the registering, vertically elongated or elliptical drawbar mount pin openings 8. The lock plate 40 is designed to slide in the drawbar 2 and the draw bolt shank 16 of a draw bolt 15 is welded or otherwise fixed to the lock plate engaging leg 44 and projects through a draw bolt opening 30a provided in the upper leg of the ball mount 30, as further illustrated in FIG. 5 of the drawings. Accordingly, the draw bolt shank 16 of the draw bolt 15 projects through the draw bolt opening 30a and the draw bolt threads 17 receive and thread into a draw bolt nut 19, which seats against the vertical leg of the bolt mount 30, as further illustrated in FIG. 5 of the drawings.

In another accessory mount aspect of the invention, the drawbar 2 is connected to a basket mount bracket 35, which is welded, bolted or otherwise secured to a basket 36 (FIG. 1). The basket 36 is typically characterized by a basket frame 37 of selected shape, dimensions and size and having a bottom and sides typically constructed of expanded metal 38, as further illustrated in FIG. 1 of the drawings. Accordingly, the lock plate 40 and accessory components are inserted in the frame interior 4 of the drawbar 2 as illustrated in FIG. 2 of the drawings and are typically stabilized in a receiver mounted on a vehicle (not illustrated), as further illustrated in FIG. 5 of the drawings and as hereinafter described.

In operation, and referring initially to FIGS. 2, 4 and 5 of the drawings, under circumstances where the trailer ball 31 is secured to the horizontal leg of a generally L-shaped ball mount 30 in conventional fashion, the vertical leg of the ball mount 30 is typically welded to one end of the drawbar frame 3 of a drawbar 2. A pair of oppositely-disposed drawbar mount pin openings 8 are provided transversely through the drawbar frame 3 and are vertically elongated or elliptically-shaped in the drawbar frame 3. A pair of opposed round hitch mount pin openings 25 (FIG. 2) are provided in the conventional trailer and accessory hitch or receiver 22, for transversely receiving a mount pin 29 when the round hitch mount pin openings 25 and the elongated drawbar mount pin openings 8 are aligned as the drawbar 2 is inserted inside the hitch interior 23 of the trailer and accessory hitch or receiver 22. As further illustrated in FIG. 5 of the drawings, the draw bolt 15 is inserted through the draw bolt opening 30a in the ball mount 30 and the draw bolt threads 17 thereof extended through a corresponding draw bolt nut 19, seated against the vertical leg of the ball mount 30. The lock plate 40 is so positioned inside the frame interior 4 of the drawbar 2 that the angle brace 53 contacts the transversely-oriented mount pin 29 and causes the drawbar 2 to rise and fall inside the trailer and accessory hitch or receiver 22, due to the action of the stationary mount pin 29 in the vertically elliptical or elongated drawbar mount pin openings 8 and the aligned or registering, round hitch mount pin openings 25, responsive to movement of the lock plate 40 forwardly or rearwardly inside the frame interior 4 of the drawbar frame 3. Accordingly, rotation of the draw bolt nut 19 by placing a wrench or other tool there effects this sliding movement of the lock plate 40 and angle brace 53 inside the frame interior 4 to tighten the angle brace 53 against the mount pin 29 or loosen it therefrom, as desired. Under circumstances where it is desired to wedge or tighten the drawbar 2 inside the trailer and accessory hitch or receiver 22, a wrench or other tool is placed on the draw bolt nut 19 and the nut 19 is rotated in the clockwise direction facing the draw bolt nut 19. This maneuver causes the draw bolt threads 17 to move forwardly inside the draw bolt nut 19 and pull the lock plate 40 forwardly, thus engaging the angle brace 53 with the mount pin 29 and lowering the drawbar 2 in the trailer and accessory hitch 24. Additional movement of the lock plate 40 and angle brace 53 forwardly forces the drawbar 2 farther downwardly due to the "play" in the elongated drawbar mount pin openings 8, such that the elongated drawbar mount pin openings 8 ride on the fixed mount pin 29, thus displacing, jamming or wedging the drawbar 2 tightly inside the hitch interior 23 of the trailer and accessory hitch or receiver 22 in the configuration illustrated in FIG. 5. This position of the lock plate 40 and angle brace 53 against the mount pin 29 and the drawbar 2 against the trailer and accessory hitch 24, prevents both lateral or horizontal and vertical movement of the drawbar 2 with respect to the trailer and accessory hitch 22, effectively eliminating vibration and "play" which is detrimental during the towing or carrying operation. Release of the angle brace 53 from contact with the mount pin 29 is effected by reversing rotation of the draw bolt nut 19, thus forcing the lock plate 40 and angle brace 53 rearwardly as the draw bolt threads 17 reverse inside the draw bolt nut 19, to facilitate upward movement of the drawbar 2, loosening of the mount pin 29 and removal of the mount pin 29 from the aligned drawbar mount pin openings 8 and corresponding round hitch mount pin openings 25.

In another embodiment of the invention, referring again to FIGS. 2, 4 and 5 of the drawings, the pin-engaging drawbar and lock plate assembly 1 includes a front stabilizing plate 45 and a rear stabilizing plate 49 located inside the frame interior 4 of the drawbar frame 3 of the drawbar 2 and both engaging the lock plate 40. The front stabilizing plate 45 has a front stabilizing plate slot 46, for accommodating the draw bolt shank 16 as illustrated in FIGS. 2 and 4. A front stabilizing plate tab 47 projects from the top of the front stabilizing plate 45 and extends through a front top frame opening 5 in the drawbar 2, into contact with the trailer and accessory hitch or receiver 22 (FIGS. 3 and 5). The rear stabilizing plate 49 has a rear stabilizing plate tab 47 projecting from the top thereof and extending through a rear top frame opening 6 provided in the drawbar frame 3 of the drawbar 2 and also engaging the trailer and accessory hitch or receiver 22 (FIGS. 3 and 4). A rear stabilizing plate rod 50 is welded or otherwise fixed to the rear stabilizing plate 45 and serves to position the rear stabilizing plate 49. Drawbar plates 7 are welded or otherwise fixed to the top plate of the drawbar frame 3 (FIG. 5) to position the front stabilizing plate tab 47 and the rear stabilizing plate tab 52.

Accordingly, it will be appreciated that when the drawbar 2 is inserted in the hitch interior 23 of the trailer and accessory hitch or receiver 22 as illustrated in FIGS. 2 and 5, the drawbar 2 is secured in place by the transverse mount pin 29 (FIG. 5). The mount pin 29 is inserted through a pair of opposed, round hitch mount pin openings 25 provided in the conventional trailer and accessory hitch or receiver 22. The round hitch mount pin openings 25 receive the mount pin 29 when the round hitch mount pin openings 25 and the corresponding opposed, vertically elongated drawbar mount pin openings 8 are aligned as the drawbar 2 is inserted in the hitch interior 23 of the trailer and accessory hitch or receiver 22.

As further illustrated in the drawings and as described above, the threaded end of the draw bolt 15 is inserted from the frame interior 4 of the drawbar 2, through the draw bolt opening 30a in the upper leg of the ball mount 30 and the front stabilizing plate slot 46 in the front stabilizing plate 45. A typically welded attachment is made between the draw bolt shank 16 and the lock plate engaging leg 44, and the extending draw bolt threads 17 thereof receive a corresponding draw bolt nut 19 at the ball mount 30. As described above, the lock plate 40 is so positioned inside the frame interior 4 of the drawbar 2 that the angle brace 53 engages the mount pin 29. This allows the drawbar 2 to rise and fall inside the trailer and accessory hitch or receiver 22, due to the action of the mount pin 29 in the elliptical or elongated drawbar mount pin openings 8 and the aligned round hitch mount pin openings 25, responsive to movement of the lock plate 40 forwardly or rearwardly inside the frame interior 4 of the drawbar frame 3. Accordingly, forward linear movement of the draw bolt 15 by placing a wrench or other tool on the draw bolt nut 19 and rotating the nut effects this sliding movement of the lock plate 40 and angle brace 53, as well as the front stabilizing plate 45 and rear stabilizing plate 49 inside the frame interior 4, causing the lock plate 40 to approach the ball mount 30 and the angle brace 53 to tightly engage the mount pin 29, as described above with respect to FIG. 5 of the drawings. This action also jams the respective front stabilizing plate tab 47 and rear stabilizing plate tab 49 tightly against the trailer and accessory hitch or receiver 22.

In application, under circumstances where it is desired to wedge or tighten the drawbar 2 inside the trailer and accessory hitch 22, a wrench or other tool is placed on the draw bolt nut 19 and is rotated in the clockwise direction facing the draw bolt nut 19. The maneuver pulls the lock plate 40 forwardly, seats the angle brace 53 against the mount pin 29 and projects the front stabilizing plate tab 47 upwardly in the front top frame opening 5 and the rear stabilizing plate tab 47 upwardly in the rear top frame opening 6 in the drawbar 2 and against the trailer and accessory hitch or receiver 22. The mount pin 29 then rises on the lock plate 40, thus lowering the drawbar 2 in the trailer and accessory hitch or receiver 22. Upward movement of the mount pin 29 is enabled by angular contact with the angle brace 53. Additional movement of the lock plate 40 forwardly forces the drawbar 2 farther downwardly due to the "play" in the vertically elongated drawbar mount pin openings 8, such that the elongated drawbar mount pin openings 8 ride on the fixed mount pin 29, thus displacing, jamming or wedging the drawbar 2 tightly inside the hitch interior 23 of the trailer and accessory hitch or receiver 22. This position of the angle brace 53 against the mount pin 29, and the drawbar 2 against the trailer and accessory hitch or receiver 22, prevents both lateral or horizontal and vertical movement of the drawbar 2 with respect to the trailer and accessory hitch 22, effectively minimizing or eliminating vibration and "play" which is detrimental during the towing or carrying operation. Release of the angle brace 53 from contact with the mount pin 29 is effected by reversing rotation of the draw bolt nut 19 on the draw bolt 15, thus forcing the lock plate 40 rearwardly, to facilitate upward movement of the drawbar 2, release of the front stabilizing plate tab 47 and rear stabilizing plate tab 52 from contact with the trailer and accessory hitch in receiver 22 and allowing removal of the mount pin 29 from the aligned drawbar mount pin openings 8 and corresponding round hitch mount pin openings 25.

It will be appreciated that the draw bolt nut 19 can be welded or otherwise fixed to the lock plate engaging leg 44 of the lock plate 40 and the draw bolt 15 positioned adjacent to the upper leg of the ball mount 30, to reverse the operating position of the draw bolt 15 and operate the pin-engaging lock plate wedge 39 in the manner described above, except by rotation of the draw bolt 15.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A pin-engaging drawbar and lock plate assembly for selectively immobilizing a drawbar having oppositely-disposed receiver pin openings, comprising:
   a pair of oppositely-disposed, vertically-elongated drawbar pin openings provided in said drawbar for selectively registering with said oppositely-disposed receiver pin openings in the receiver;
   a pin extending through said oppositely-disposed receiver pin openings and said pair of said oppositely-disposed, vertically-elongated drawbar openings;

a lock plate movably disposed in said drawbar and an angle brace fixed to said lock plate for engaging said pin;

a draw bolt engaging said lock plate and said drawbar for selectively moving said lock plate and tightening said angle brace against the pin in said drawbar and forcing the drawbar against the receiver responsive to manipulation of said draw bolt;

wherein the drawbar has a top side and a bottom side therein and wherein said lock plate has a substantially flat bottom slidably disposed on said bottom side of the drawbar.

2. The pin-engaging drawbar and lock plate assembly of claim 1 further comprising a nut engaging said lock plate and wherein said draw bolt extends through the drawbar and threadably engages said nut, wherein said lock plate is moved and said angle brace is selectively tightened against the pin responsive to rotation of said draw bolt.

3. The pin-engaging drawbar and lock plate assembly of claim 1 wherein said draw bolt comprises a shank end fixed to said lock plate and a threaded end extending through the drawbar and E. nut threaded on said threaded end and seated against the drawbar, wherein said lock plate is moved and said angle brace is selectively tightened against the pin responsive to rotation of said nut.

4. The pin-engaging drawbar and lock plate assembly of claim 1 comprising a first top frame opening provided in said drawbar and comprising a front stabilizing plate engaging said lock plate and a front stabilizing plate slot for receiving said draw bolt and a front stabilizing plate tab extending from said front stabilizing plate through said first top frame opening in said drawbar to the receiver, wherein said angle brace tightens against the pin and said front stabilizing plate tab and the drawbar are forced against the receiver responsive to manipulation of said draw bolt.

5. The pin-engaging drawbar and lock plate assembly of claim 4 wherein said draw bolt comprises a shank end fixed to said lock plate, said shank end extending through said front stabilizing plate slot and a threaded end of said draw bolt extending from the drawbar for receiving a nut, wherein tightening of said nut on said threaded end of said draw bolt tightens said angle brace on said lock plate against said pin and said front stabilizing plate tab against: the receiver and the drawbar against the receiver receptacle.

6. The pin-engaging drawbar and lock plate assembly of claim 4 comprising a second top frame opening provided in said drawbar and comprising a rear stabilizing plate engaging said lock plate and a rear stabilizing plate tab extending from said rear stabilizing plate through said second top frame opening in said drawbar to the receiver, wherein said angle brace tightens against the pin and said rear stabilizing plate tab, said front stabilizing plate tab and the drawbar are forced against the receiver responsive to manipulation of said draw bolt.

7. The pin-engaging drawbar and lock plate assembly of claim 6 wherein said draw bolt comprises a shank end fixed to said lock plate, said shank end extending through said front stabilizing plate slot and a threaded end of said draw bolt extending from the drawbar for receiving a nut, wherein tightening of said nut on said threaded end of said draw bolt tightens said angle brace on said lock plate against said pin and said front stabilizing plate tab against: the receiver and the drawbar against the receiver receptacle.

8. In a drawbar for connecting an accessory to a trailer hitch receiver having a receiver receptacle and round, oppositely-disposed, transverse pin or bolt openings, wherein the drawbar is removably disposed in the receiver receptacle, the improvement comprising:

vertically-elongated openings provided in the drawbar, respectively, for registering with the round, oppositely-disposed, transverse pin or bolt openings ir the receiver receptacle;

a pin or bolt extending through said elongated openings in the drawbar and the registering round, oppositely-disposed, transverse pin or bolt openings in the receiver receptacle to prevent the drawbar from exiting the receiver receptacle;

a lock plate slidably disposed in the drawbar and an angle brace fixed to said lock plate for engaging the pin or bolt; and a nut engaging said lock plate and a draw bolt extending through the drawbar and threadably engaging said nut for said displacing and tightening the drawbar against the trailer hitch receiver.

9. The drawbar of claim 8 comprising a first top frame opening provided in the drawbar and comprising a front stabilizing plate engaging said lock plate and a front stabilizing plate slot for receiving said draw bolt and a front stabilizing plate tab extending from said front stabilizing plate through said first top frame opening in said drawbar to the receiver, wherein said angle brace tightens against the pin and said front stabilizing plate tab and the drawbar are forced against the receiver receptacle responsive to manipulation of said draw bolt.

10. The drawbar of claim 9 comprising a second top frame opening provided in the drawbar and comprising a rear stabilizing plate engaging said lock plate and a rear stabilizing plate tab extending from said rear stabilizing plate through said second top frame opening in said drawbar to the receiver, wherein said angle brace tightens against the pin and said rear stabilizing plate tab, said front stabilizing plate tab and the drawbar are forced against the receiver receptacle responsive to manipulation of said draw bolt.

11. A method for selectively tightening a drawbar in a receiver receptacle having round, oppositely-disposed, transverse pin openings, comprising the steps of:

(a) providing vertically-elongated or elliptical openings in the drawbar, respectively, for alignment with the pin openings in the receiver receptacle and receiving a pin or bolt to prevent removal of the drawbar from the receiver receptacle;

(b) providing a lock plate having an angle brace in the drawbar, with the angle brace engaging the pin or bolt;

(c) fixing the unthreaded end of a threaded draw bolt to the lock plate and extending the threaded end of the threaded draw bolt through the drawbar and threading a nut on the threaded end of the threaded draw bolt;

(d) providing a front stabilizing plate having a front tab extending through the wall of the drawbar, said front stabilizing plate engaging the lock plate and a slot provided in the front stabilizing plate for receiving the threaded rod, wherein the angle brace is tightened against the pin or bolt and the front stabilizing plate is tightened against the receiver receptacle for said tightening the drawbar against the receiver receptacle; and (e) providing a rear stabilizing plate having a rear tab extending through the wall of the drawbar, said rear stabilizing plate engaging the lock plate, wherein the angle brace is tightened against the pin or bolt and the front tab of the front stabilizing plate and the rear tab of the rear stabilizing plate are tightened against the receiver receptacle for said tightening the drawbar against the receiver receptacle.

* * * * *